United States Patent
Kaneko (10) Patent No.: US 6,678,112 B1
(45) Date of Patent: Jan. 13, 2004

(54) DISK DRIVE DEVICE

(75) Inventor: Hisashi Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/490,239

(22) Filed: Jan. 24, 2000

(30) Foreign Application Priority Data

May 18, 1999 (JP) .......................................... 11-136980

(51) Int. Cl.[7] .............................................. G11B 33/12
(52) U.S. Cl. .................................................. 360/97.01
(58) Field of Search .......................... 360/264.2, 97.01, 360/266.3, 97.02; 439/67, 271, 277, 556, 559, 620, 493, 495, 497

(56) References Cited

U.S. PATENT DOCUMENTS

| | | | | |
|---|---|---|---|---|
| 5,276,577 A | * | 1/1994 | Brooks et al. | 360/97.02 |
| 5,969,901 A | * | 10/1999 | Eckberg et al. | 360/97.01 |
| 6,129,579 A | * | 10/2000 | Cox et al. | 439/493 |
| 6,146,189 A | * | 11/2000 | Nomura et al. | 439/493 |
| 6,168,459 B1 | * | 1/2001 | Cox et al. | 439/495 |
| 6,270,375 B1 | * | 8/2001 | Cox et al. | 439/493 |

FOREIGN PATENT DOCUMENTS

| | | | | | |
|---|---|---|---|---|---|
| JP | 02292791 A | * | 12/1990 | ........... | G11B/33/14 |
| JP | 3-286488 | * | 12/1991 | | |
| JP | 5-74121 | * | 3/1993 | | |
| JP | 5-89652 | * | 4/1993 | | |
| JP | 5-266647 | * | 10/1993 | | |
| JP | 11025666 A | * | 1/1999 | ........... | G11B/33/12 |
| JP | 2000-243077 | * | 9/2000 | | |

OTHER PUBLICATIONS

"Flexible Cable Braket Design to Hold Head Wire Tube," IBM Technical Disclosure Bulletin, vol. No. 38, Iss. No. 4, pp. 281–282.*

* cited by examiner

Primary Examiner—William Klimowicz
(74) Attorney, Agent, or Firm—Greer, Burns & Crain, Ltd.

(57) ABSTRACT

A magnetic or other disk drive device includes a base having an opening through which electrical signal lines in a cable pass. The signal lines are preferably in a flexible printed circuit (FPC). The opening is sealed by adhesively securing a cover to the base around the periphery of the opening, either directly or indirectly. In one embodiment, the cover is secured directly to the base, except of course where it crosses signal lines, while in other embodiments the FPC is secured directly to the base and the cover is secured to the FPC. In the latter embodiments, a portion of the FPC extends around the periphery of the opening, and the signal lines pass through the opening. Double sided adhesive tape may be used to secure the FPC to the base, if desired.

14 Claims, 9 Drawing Sheets

PRIOR ART

FIG. 1

PRIOR ART

FIG. 12

DISK DRIVE DEVICE

This invention relates to disk drive devices, and more particularly, to structures that seal an opening through which a flexible printed circuit board (FPC) passes from the inside of a disk drive housing to the outside of the disk drive housing.

BACKGROUND OF THE INVENTION

In recent years, low cost, high performance disk drives have been in demand as the use of personal computers has spread. To achieve low cost and high performance, new structures are required.

In general, a magnetic or other disk drive device has a housing that includes a base and a cover, one on top of the other. Within the housing are mechanisms such as a spindle motor that rotates a magnetic disk, and an actuator that supports heads that read data from or write data to the magnetic disk. A control printed circuit board, on which is located a controller that controls these mechanisms, is located on the outside of the housing. The sending and receiving of signals between the mechanisms within the housing and the control printed circuit board take place through an FPC.

In order to extend the FPC from the inside of the disk drive housing to the outside of the housing, the housing must have an opening in it. However, if this opening is not adequately sealed, problems will arise, such as an increase in signal noise and the entry of foreign matter to the inside of the housing, ruining the reliability of the disk drive device. As a consequence, there is a need for structures which create an airtight seal in the housing when extending the FPC to the outside of the housing.

Figure 1:
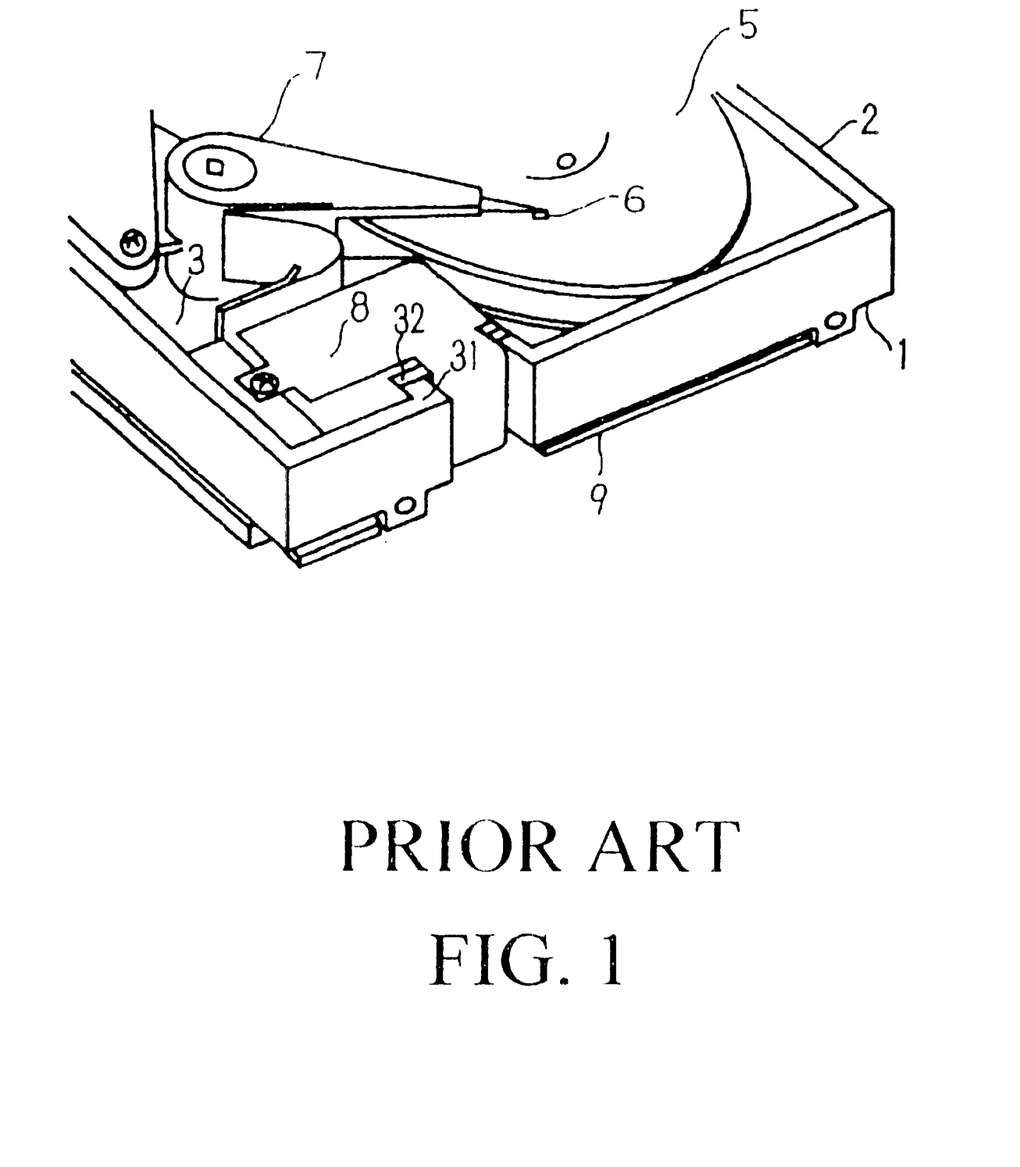
FIG. 1 is a drawing of a first prior art disk drive device.

FIG. 1 shows one known approach for extending the FPC to the outside of the disk drive housing. In FIG. 1, a magnetic disk drive device has a base 2. The disk drive housing is formed by placing a cover (not shown) on top of the base of the housing. On an inside bottom surface 3 of the housing base 2 are installed components such as magnetic disks 5 that store data, magnetic heads 6 that read and write data to the magnetic disks 5, and an actuator 7 that supports the magnetic heads 6 and drives the heads 6 in the radial direction of the magnetic disks 5. A controller, which controls mechanisms such as the actuator 7 and magnetic heads 6, is located on a printed circuit board, installed on the outside bottom surface of the disk drive housing 1. The sending and receiving of signals between the mechanisms on the inside of the housing and the control printed circuit board 9 on the outside of the housing takes place through the FPC 8.

As shown in FIG. 1, the FPC 8 extends from a housing base alignment surface for installing the housing cover to the base 2, and is then placed in the position designated for the control printed circuit board 9. In addition, double-sided adhesive tape is applied to an alignment surface 31 to set the FPC 8 firmly in place on the base 2. In this condition, the housing is then sealed tightly by placing the cover on top of the base 2.

Figure 2:
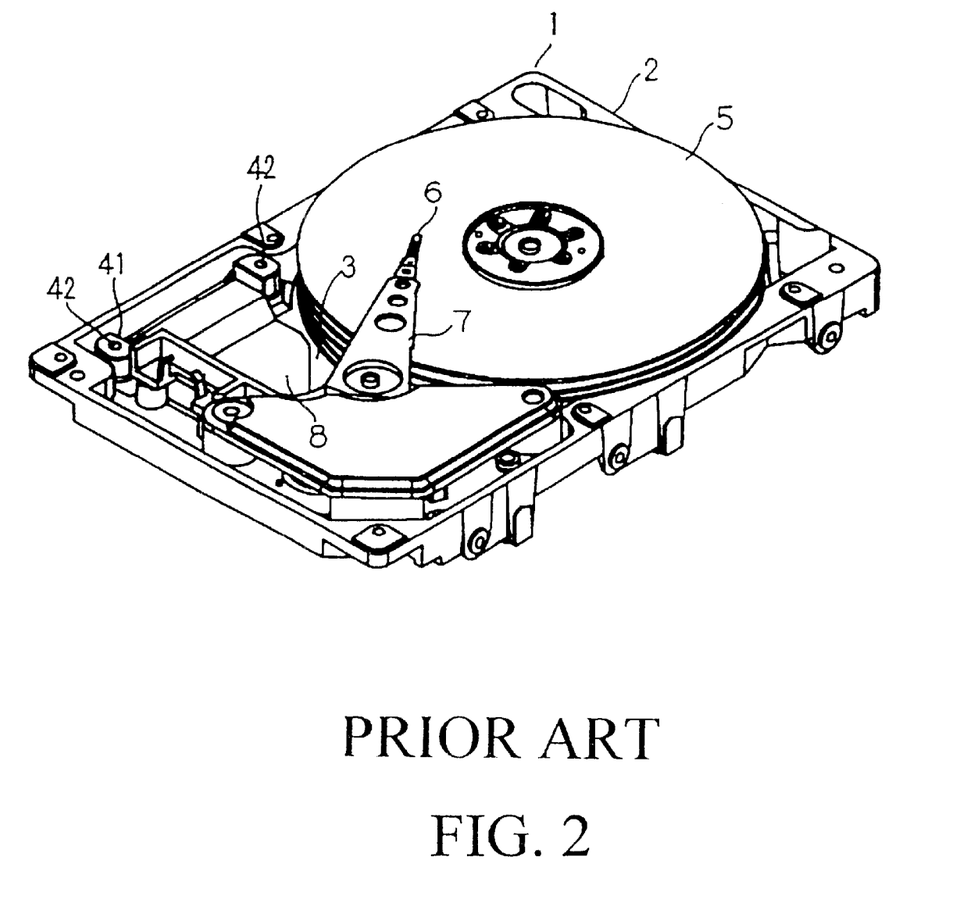
FIG. 2 is a drawing of another prior art disk drive device.

FIG. 2 shows another prior art system, in which the FPC 8 has been relocated to the outside of the housing. In FIG. 2, a connector with a plastic frame is attached to an end section of the FPC 8 and the control printed circuit board 9 (not shown). Further, a hole (not shown) is created in the housing base 2, and the connector 41 is held over the hole by screws 42. The periphery of the hole is filled with a packing material (not shown) such as rubber, and a tight seal of the housing 2 is established by inserting the packing material between the connector 41 and the inside bottom surface 3 of the housing base 2. The pins (not shown) of the connector 41 are exposed at the bottom of the base 2 to allow an electrical connection with the control printed circuit board 9.

In the first prior art system, a tight seal of the housing is accomplished by placing a strip of double-sided surface adhesive tape 32 between the FPC 8 and the base alignment surface 31. Since the structure of the first prior art device is simple, placing the FPC 8 on the outside of the housing 1 can be accomplished at relatively low cost. However, because the FPC 8 is extended through the base alignment surface 31, and because its installation position is across a bottom surface of the housing 1, the length of the wiring increases. A long length of wire allows noise to get into the signals, creating the problem of obstructed high speed signal transfer.

On the other hand, in the prior art of FIG. 2, the FPC 8 extends through the hole created in the inside bottom surface 3 of the housing base 2. As a consequence, the wiring length can be relatively short, which makes it difficult for noise to get into the signals, which is a benefit to high speed signal transfer. However, because large areas are necessary to create openings for the connector 41 and the screws 42, there are limitations on wire layout freedom, which makes it difficult for the ideal wiring route to be taken. Moreover, because components such as the connector 41, hole packing material (not shown), and screws 42 are required, and because screw holes have to be formed and a production step added to fix the connector 41 in place with screws, there are problems of higher cost of parts and higher cost of production. Thus, there is a need for disk drive devices that allow the transfer of high quality signals at low cost.

Accordingly, one object of this invention is to provide new and improved reliable disk drive devices.

An additional object is to provide new and improved compact disk drive devices having low production cost.

Yet another object is to provide new and improved disk drive devices that allow high quality signal transfer to take place.

BRIEF SUMMARY OF THE INVENTION

The above-listed objects are met or exceeded by the present invention, in which a magnetic or other disk drive device has one or more heads for writing or reading data on disk media, and an actuator for driving the heads in the radial direction on the disk media. The head and actuator are located on an inside surface of a base, and are controlled by components located outside the base by way of signal lines which pass through an opening in the base. The opening is sealed with a cover.

In one embodiment, the signal lines are part of a flexible printed circuit (FPC) or the like which has an expanded area which surrounds the opening. The signal lines extend through a space within the expanded area and the opening to the outside of the base. The cover is placed over the opening and is adhesively secured to the PFC around the periphery of the opening to seal the opening.

With this invention, it is possible to obtain signals that travel fairly directly from the bottom surface of the base to the heads, which shortens the length of the wiring. This reduces the electrical noise that gets into the signals, and allows faster signal speed. Further, because a connector is not required and because a production step to attach the connector is not required, the production cost can be reduced. This is due to a reduction in the number of parts as well as a reduction in the number of production steps.

In particular, by installing the FPC to the base using adhesion, screws are not required to hold the FPC in place. Because of this, no space is required for screw holes, which allows fewer restrictions in terms of component layout. In addition to this, a production step to place screw holes in the base is not required, reducing production cost.

Further, by making the cover component conductive, the intrusion of noise from the housing will be restricted. This further prevents the malfunctioning of the mechanisms located within the disk drive housing.

In addition to this, by creating an expanded area on the FPC that surrounds the end section of the FPC, and by having this expanded area adhere tightly to the periphery of the opening, the surface that adheres tightly to the cover component on the FPC can be flat, eliminating gaps between the FPC and the cover component. As a result, the benefit is a positive airtight seal of the housing.

BRIEF DESCRIPTION OF THE DRAWINGS

The above mentioned and other features of this invention and the manner of obtaining them will become more apparent, and the invention itself will be best understood by reference to the following description of the invention taken in conjunction with the accompanying drawings, in which.

DETAILED DESCRIPTION OF THE INVENTION

Figure 3:
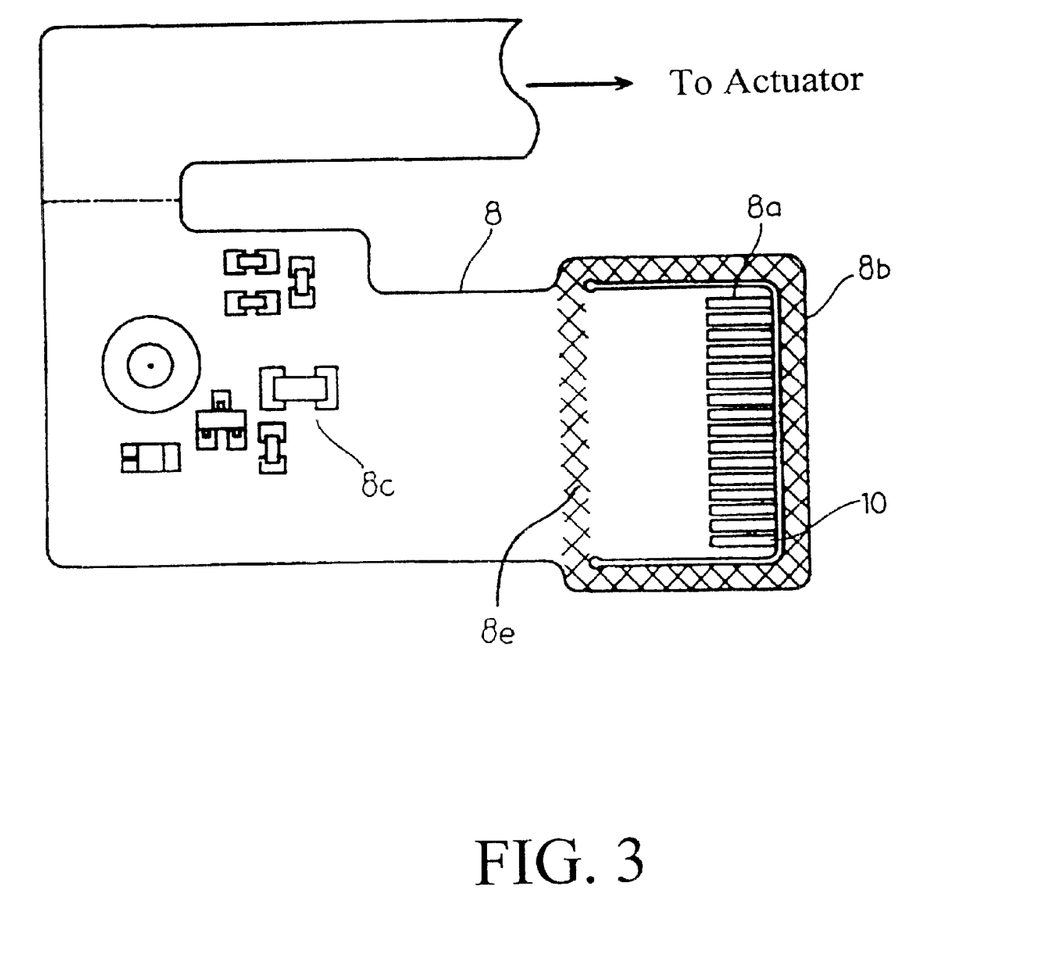
FIG. 3 is a top view of a flexible printed circuit made in accordance with a first embodiment of the present invention.

FIG. 3 shows a flexible printed circuit cable (FPC) for use in this invention. In FIG. 3, a FPC 8 has electrically conductive signal lines (not shown). The signals lines are separated by a sheet composed of a material with insulating properties, such as a polyamide. Its thickness is typically from 0.1 mm to 0.2 mm.

A plurality of pin terminals 10, on which the signal lines are exposed, is located at a first end 8a of FPC 8. The pin terminals 10 connect to a control printed circuit board or the like. The first end 8a is shaped to fit in a card edge connector, and makes connection through an opening in a base of a disk drive device. The first end 8a connects to the control printed circuit board, which is located on the outside of a housing at the bottom of the base. The actuator that drives the magnetic heads is fixed in place on the opposite end of the first end 8a of the FPC 8.

An installation section 8b, which is preferably formed as a single unit with the FPC 8, surrounds the periphery of the first end 8a. The signal lines in the cable pass through the section 8b in a signal line area 8e. In FIG. 3, the installation section 8b (shaded area) attaches to the base and is fixed to the base. Electrical elements 8c maybe provided at other locations on the FPC 8. The end 8a is provided at the end of the FPC 8 on the side where the control printed circuit board is located.

Figure 4:
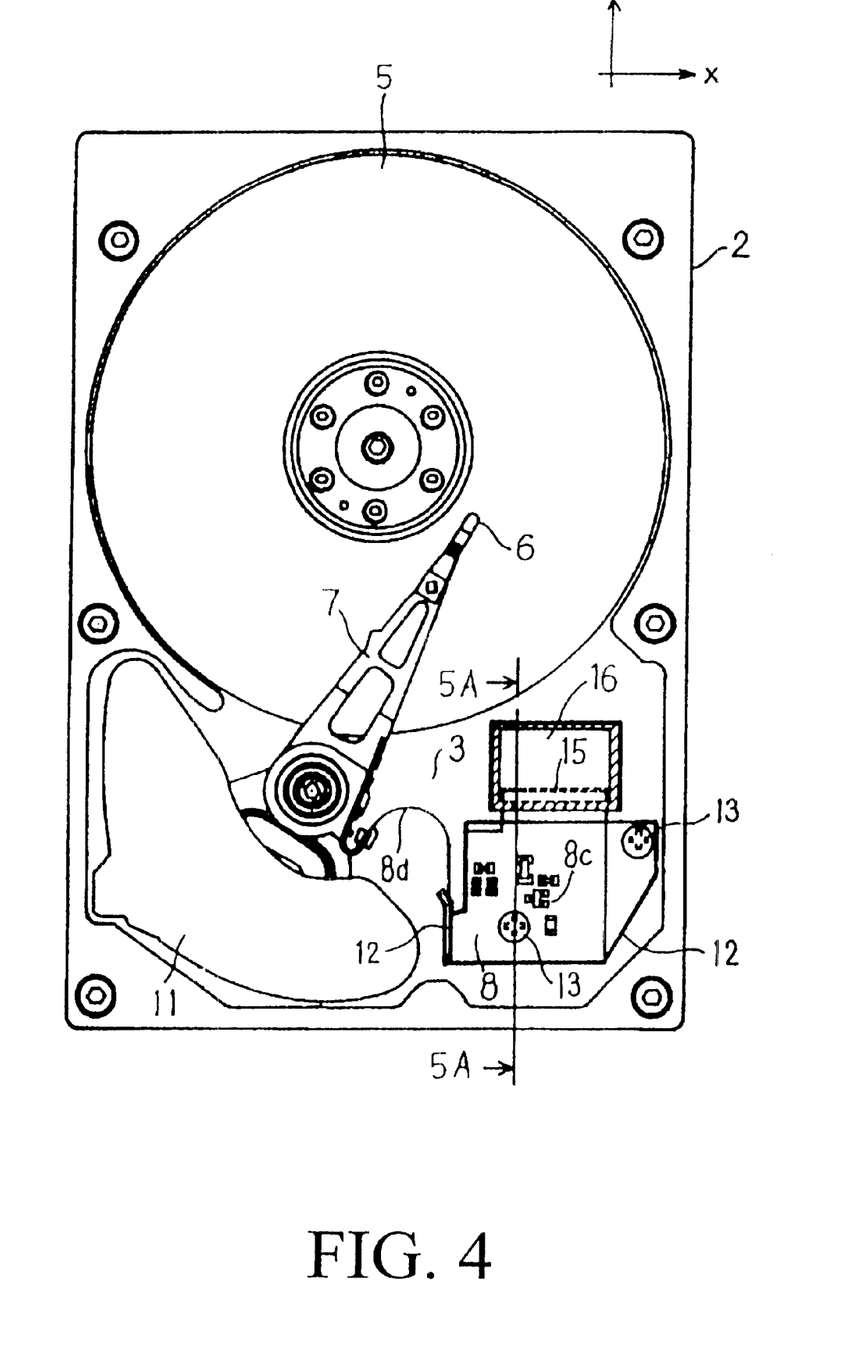
FIG. 4 is a top view of a disk drive device which incorporates the flexible printed circuit of FIG. 3.

FIG. 4 shows a top view of a magnetic disk drive device in which the FPC 8 of FIG. 3 is installed, although the invention is applicable to other devices such as optical drives and the like. As shown in FIG. 4, over half of the area of the inside bottom surface 3 of the base 2 is occupied by the disk 5. The magnetic circuitry 11 that rotates the actuator 7 around the center of its rotating shaft (not shown) is located in the corner of the base 2. The corner to the right of the comer where the magnetic circuitry 11 is located is allocated to the placement of the FPC 8.

The FPC 8, which is flexible, is secured to a guide plate 12 that is rigid. The FPC 8 is formed in a designated shape. The guide plate 12 is generally made of a plastic or an aluminum alloy with a thickness of from about 1 mm to 2 mm. The guide plate 12 is located between the FPC 8 and the base 2, and is secured to the base 2 by screws 13. The guide plate is used to form the shape of the FPC. The FPC 8 has a curved section 8d which retains its flexibility and is located between the area where the guide plate 12 is fixed in place and the area where the actuator 7 is fixed in place. In this manner, the actuator 7 is able to rotate in a smooth manner.

A hole or opening 15 is located in the base 2. The opening 15 preferably has dimensions of about 10 mm to 20 mm in the x direction and 1 mm to 5 mm in the y direction. The first end 8a of the FPC 8 shown in FIG. 3 passes through the hole 15 to the outside bottom surface of the base 2. In addition, the area indicated by the slanted lines at the opening 15 is the surface for joining the installation section 8b of the FPC 8 to the inside bottom surface 3 of the base 2.

The opening 15 is sealed airtight using a seal 16. The airtight seal 16 has a thickness of about 0.05 mm to 0.15 mm. Its length in the x direction is about 15 mm to 30 mm and in the y direction about 10 mm to 30 mm. It also may be flexible. Examples of materials that can be used as the sealing material include polyester and polyamide. The airtight seal 16 seals the housing 2 airtight by being attached to the top of the FPC 8 installation section 8b, which is installed firmly to the inside bottom surface 3 of the base 2.

Figure 5:
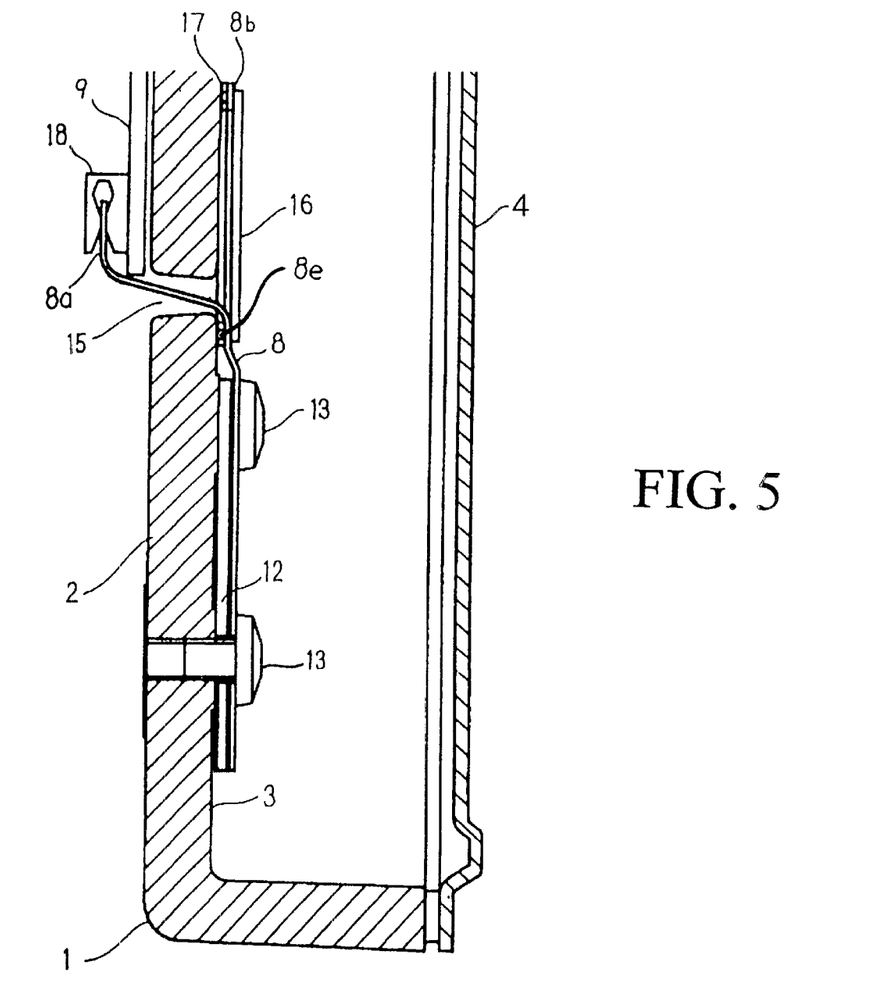
FIG. 5 is a cross section view of a portion of the disk drive device shown in FIG. 4, taken along lines 5A—5A.
Figure 6:
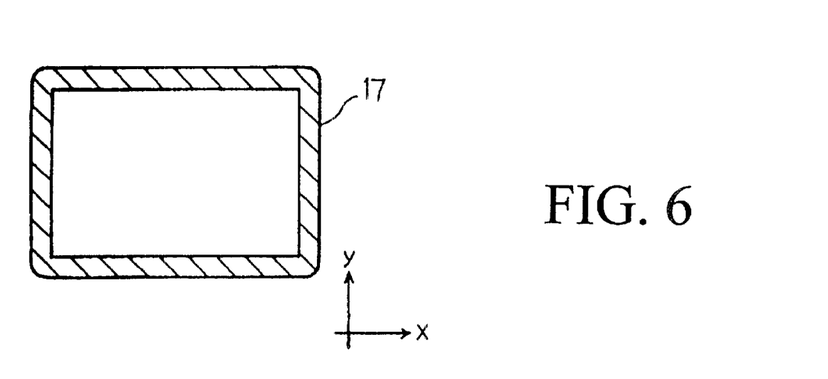
FIG. 6 shows double-sided adhesive tape used in the embodiment shown in FIG. 3.

FIG. 5 shows a cross section of that portion of FIG. 4 that is represented by the designation 5A—5A. As shown in FIG. 5, the FPC 8 installation section 8b is installed on the inside bottom surface 3 of the base 2 using double-sided adhesive tape 17. As shown in FIG. 6, the double-sided adhesive tape 17 has a frame shape such that it surrounds the opening or hole 15. The double-sided adhesive tape 17 has a thickness of about 0.05 mm to 0.5 mm and peripheral measurements that are nearly the same as the previously described airtight seal 16. The double-sided adhesive tape 17 has a width of about 1 mm to 3 mm. The double-sided adhesive tape 17 is applied to the area of the inside bottom surface 3 of the base 2 indicated by the slanted lines shown in FIG. 4. The slanted line area can be slightly depressed, as seen in FIG. 5. The hole 15 is sealed off and the housing is made airtight by applying the airtight seal 16 to the top of the installation section 8b of the FPC 8, which is sealed to the inside bottom surface 3 of the base 2.

The first end 8a of the FPC 8 passes through the hole 15 to the outside of the housing 1. The control printed circuit board 9 is installed to the outside bottom surface of the base 2. The communication of signals between the inside of the housing 1 and the controller (not shown) that is located on the control printed circuit board 9 is possible because the first end 8a of the FPC 8 connects to a connector 18 that is on the control printed circuit board 9. The area in front of the first end 8a of the FPC 8 is applied to the guide plate 12 and installed together with the guide plate 12 by screws 13 to the base 2.

Figure 7:
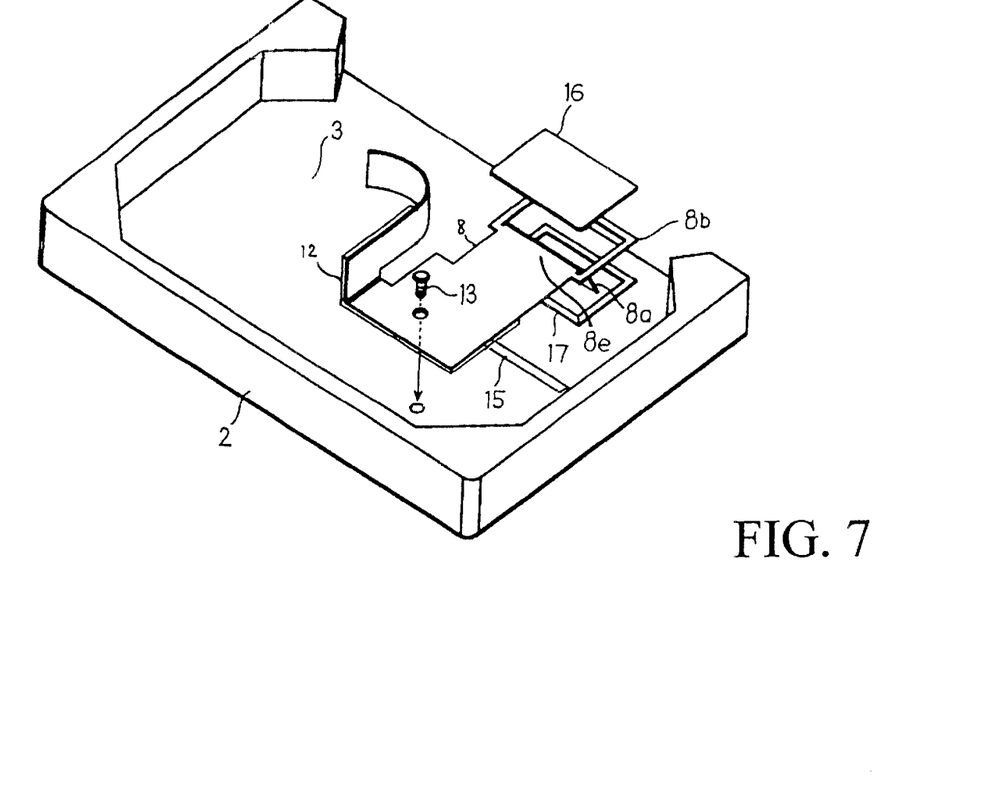
FIG. 7 is an exploded view which shows the steps for installing the first embodiment of this invention in the disk drive device of FIG. 4.

FIG. 7 shows the process by which the FPC 8 is installed in the magnetic disk drive device of the first embodiment of this invention. First, the double-sided adhesive tape 17 is applied to the inside bottom surface 3 of the base 2 in a manner that encompasses the hole 15.

Next, the first end 8a of the FPC 8 is passed through the hole 15 to the outside bottom surface of the base 2, overlapping the double-sided adhesive tape 17 with the installation section 8b so that the installation section 8b is attached firmly to the base 2. The FPC 8 is installed on the base 2 so that it is attached to the guide plate 12. After the installation section 8b is firmly attached, the guide plate 12 is secured on the base 2 using the screws 13.

Once the installation of the FPC 8 to the base 2 has been completed, the airtight seal 16 is applied to the installation section 8b such that the edge of the airtight seal 16 overlaps the signal line portion 8e of the first end 8a of the FPC 8 and the outer periphery of the double-sided adhesive tape 17, to seal off the opening 15. As seen in FIG. 7, the joining surfaces of the double-sided adhesive tape 17, the installation section 8b, including the signal line portion 8e, and the airtight seal 16 are flat, allowing the opening 15 to be positively closed off, without a gap at the airtight seal 16 or at the double-sided adhesive tape 17.

The above described disk drive device of the first embodiment of this invention eliminates differences in levels on the sealing surfaces by using a low cost structure of one strip of double-sided adhesive tape and one airtight seal, which provides a positive airtight seal structure. In addition, because the FPC can be located at a desired location in the base, the FPC can be connected to the control printed circuit board, which is installed on the outer surface of the base, at the shortest distance. For high performance magnetic disk drive devices of recent years, this will allow high speed recording and the transfer of playback signals in a high quality condition.

Figure 8:
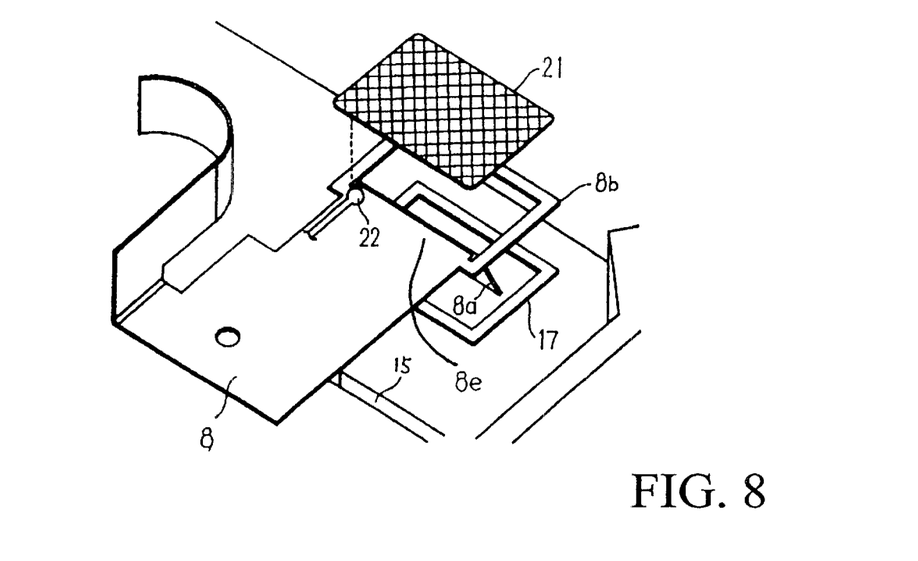
FIG. 8 is an exploded view of a second embodiment of the invention.

FIG. 8 shows a second embodiment of this invention. One difference between the disk drive device shown in FIG. 8 and the first embodiment is that a ground pad 22 has been placed on the FPC 8. Also, the opening 15 is closed off and sealed by means of conductive tape 21, which has conductive properties.

Just as with the sealing tape 16 indicated previously, the conductive tape 21 is aligned so that its edge overlaps the outer edge of the installation section 8b of the FPC 8. It is applied to the upper surface of the installation section 8b. The ground pad 22 is placed below the conductive tape and makes contact with the conductive tape 21.

Because the conductive tape 21 and the ground pad 22 make contact, the conductive tape is set at grounding electrical potential. As a result, the opening 15 of the base 2 is covered with the grounded material, which restricts noise from entering the inside of the housing 1 from the outside of the housing 1, and prevents potential malfunctions of the magnetic disk drive device.

Figure 9:
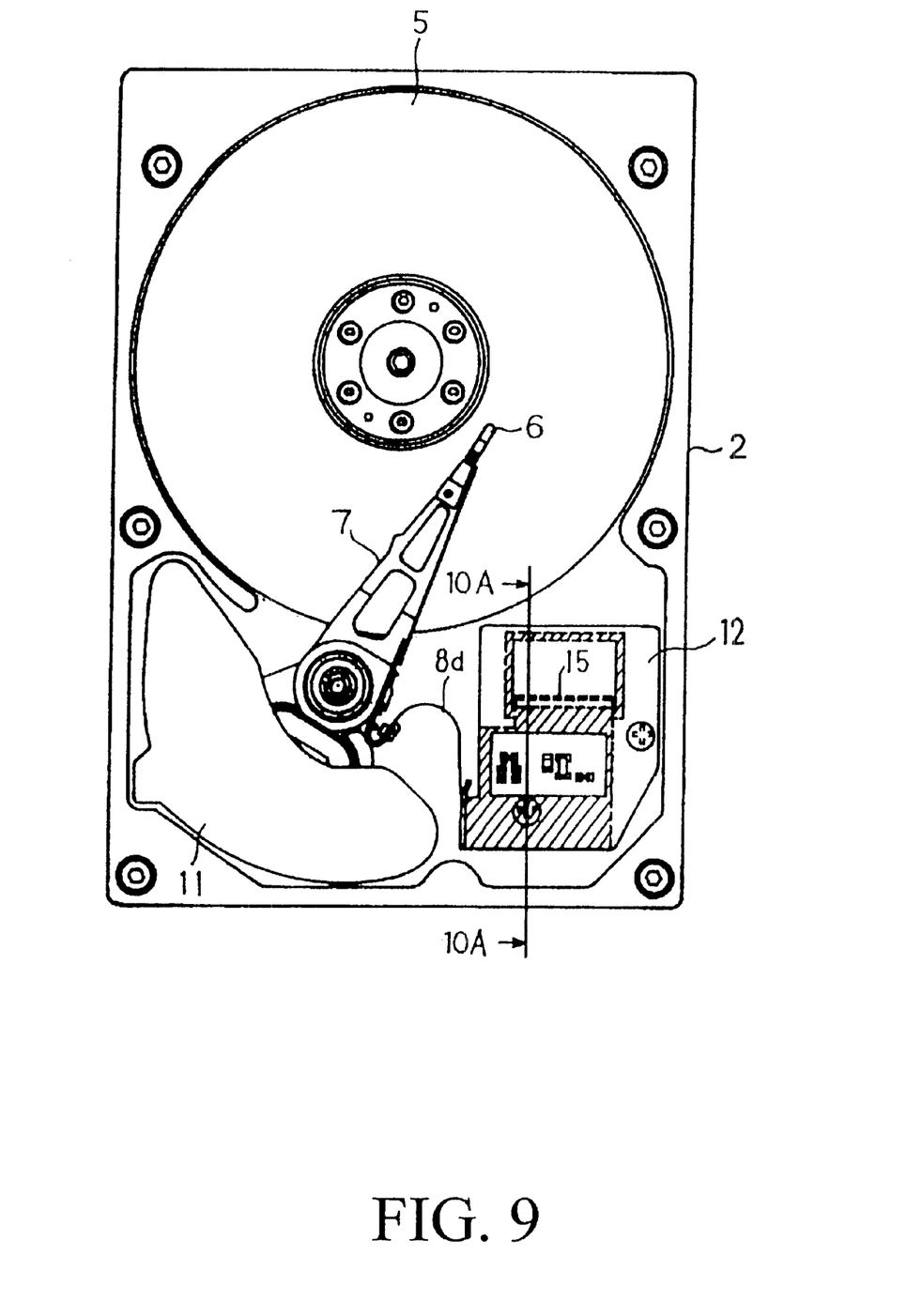
FIG. 9 is a top view of a disk drive device which includes a third embodiment of the invention.

FIG. 9 shows a top view of a third embodiment of the invention. The differences between the disk drive device shown in FIG. 9 and the disk drive device of the first embodiment are that instead of the flexible airtight seal 16 being used to close off the opening 15, a guide plate 12 that is rigid is used. In addition, in the first embodiment, the guide plate 12 was located between the FPC 8 and the base 2. However, if the positional relationship between these components were as indicated in FIG. 9, the FPC 8 could not be passed through to the outside of the housing 1 because the opening 15 would be blocked by the guide plate 12. For this reason, in the third embodiment, the structure is such that the FPC 8 is located between the guide plate 12 and the base 2. However, a hole 23 has been opened in the guide plate 12 to prevent the component section 8c on the FPC 8 from making contact with the guide plate 12.

In addition, in order to close off the gap between the guide plate 12 and the FPC 8, and in order to have the FPC 8 create a tight seal to the guide plate 12, double-sided adhesive tape 24 is placed between the guide plate 12 and the FPC 8. Two surface adhesive tape 24 is located in the area of the drawing with the slanted lines, which is between the guide plate 12 and the FPC 8.

The FPC 8 of the third embodiment can be the same FPC as that of the first embodiment. Therefore, an explanation of this component will be omitted.

Figure 10:
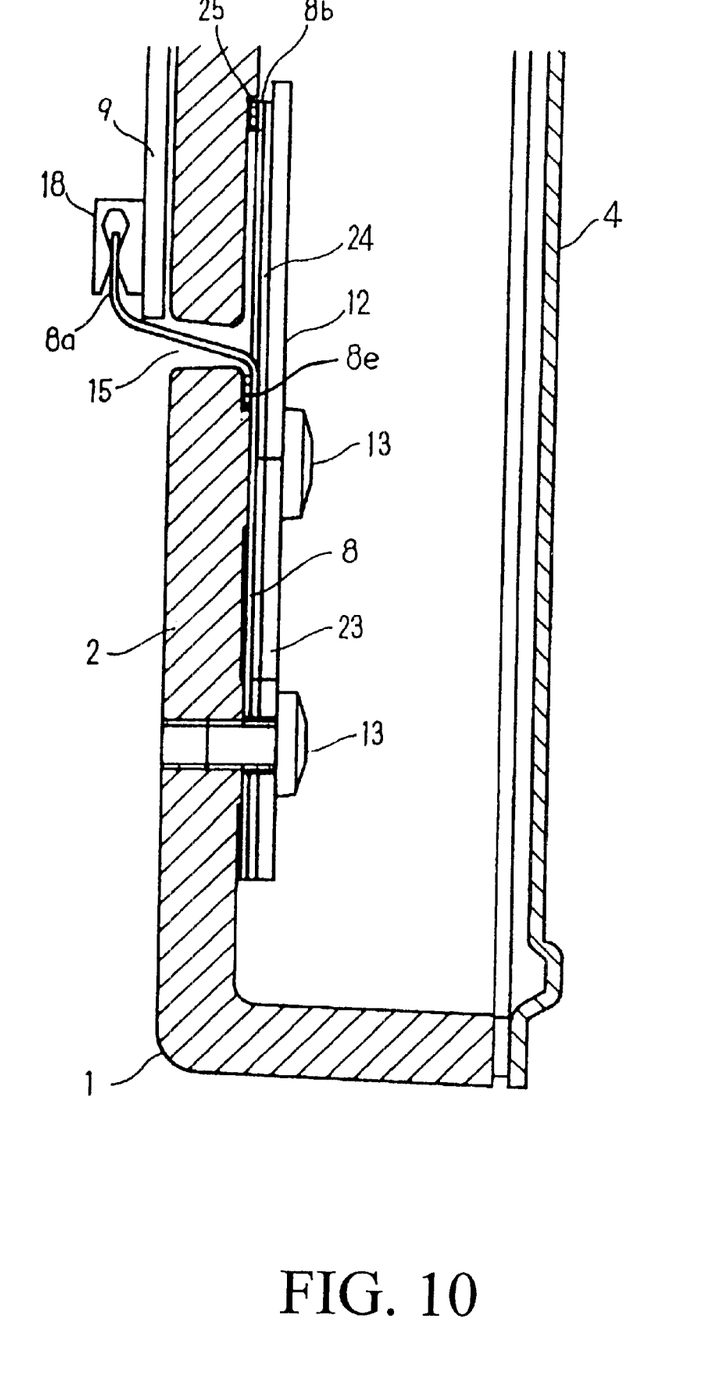
FIG. 10 is a cross section view of the disk drive device of FIG. 9 taken along lines 10A—10A in FIG. 9.

FIG. 10 shows a cross section of section 10A—10A of the magnetic disk drive device shown in FIG. 9. As shown in FIG. 10, a difference in level has been formed between the surrounding area of the opening 15 and the other area at the inside bottom surface of the base. The difference in level is from about 0.5 mm to 1 mm. A packing material 25 such as rubber is placed along this difference in level. The surface dimensions of the packing material 25 are essentially equal to those of the double-sided adhesive tape 17 shown in FIG. 6, with a height that is slightly above the height of the level difference. The guide plate 12 is installed on the base 2 by means of screws 13. Also, tightening the screws 13 compresses the guide plate 12 against the packing material 25, firmly attaching the installation section 8b to the base 2 through the packing material 25.

In this case, the reason the area around the hole 15 was made lower in the third embodiment of this invention is for the purpose of making the guide plate 12 parallel to the inside bottom surface 3 of the base 2. If the FPC 8 contact surface in the base 2 and the area there that holds the packing material 25 were the same height, the distance from the inside bottom surface 3 of the base 2 would increase as the guide plate 12 neared the front end of the installation section 8b. This would result in the installation section 8b of the FPC 8 not being able to make firm contact with the inside bottom surface 3 of the base 2. In turn, the disk drive housing 1 would not be able to establish an airtight seal.

The FPC 8 is stuck to the guide plate 12 by double-sided adhesive tape 24. The double-sided adhesive tape 24 has a thickness of from about 0.05 mm to 0.2 mm.

Below, an explanation of the process steps for installing the FPC 8 to the disk drive device of the third embodiment will be given.

The packing material 25 is installed and the double-sided adhesive tape 24 is applied to the guide plate 12. The FPC 8 is applied to the guide plate 12, to which the double-sided adhesive tape 24 has already been applied. After the FPC 8 has been firmly applied to the guide plate 12, the first end 8a of the FPC 8 is passed through the hole 15 in the base 2 to the outside bottom surface of the base 2. Then, the guide plate 12, to which the FPC 8 is firmly attached, is aligned on the base 2. When the guide plate 12 has been placed in its designated location, the screws 13 are tightened down to the base 2 to fix both the guide plate 12 and the FPC 8 in place on the base 2.

Based on the third embodiment of this invention, the opening 15 is closed off by the guide plate 12, which is rigid. By sealing the opening 15 with a rigid component, even if a small foreign object touches the housing 1 from the outside, it is prevented from being thrust inside of the housing 1. Furthermore, because the guide plate is also used as the component for closing off the hole, the seal 10 used in the first embodiment becomes unnecessary.

Figure 11:
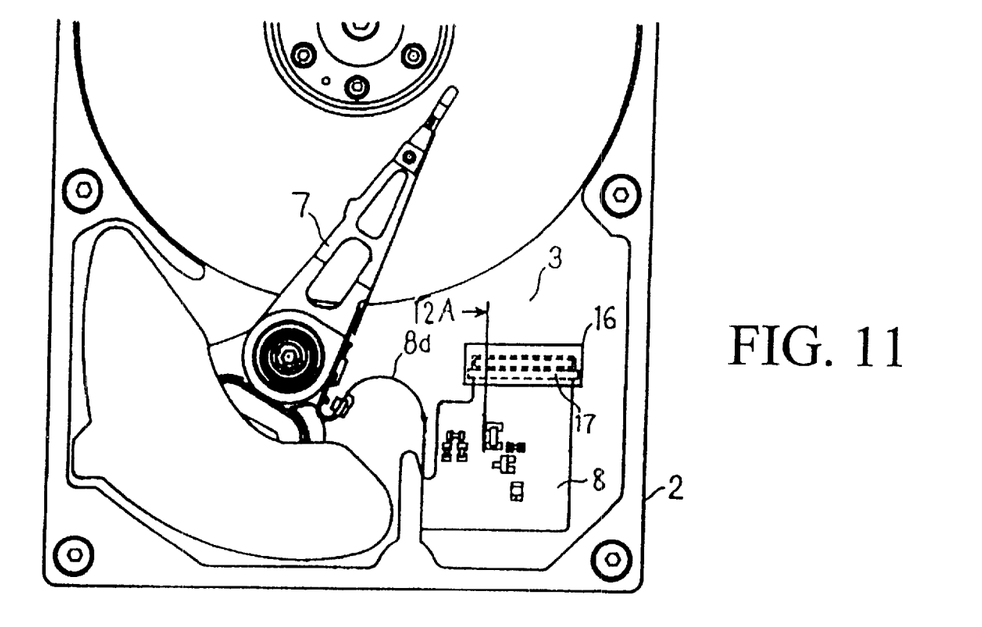
FIG. 11 is a top view of a portion of a disk drive device which includes a fourth embodiment of the invention.

FIG. 11 shows a top view of a fourth embodiment of the invention. The fourth embodiment differs from the other embodiments that have already been described in that the installation section 8b of the FPC 8 is not provided. Also, between the FPC 8 and the inside bottom surface 3 of the base 2, the structure of the fourth embodiment is such that the FPC 8 is secured firmly to the base 2 through double-sided adhesive tape 17 that differs from the double-sided adhesive tape shown in FIG. 6 in that it does not have a ring shape. The double-sided adhesive tape 17 of the fourth embodiment has a bar shape, and it is applied to only one side of the area along the hole 15 in the inside bottom surface 3 of the base 2. The airtight seal 16 is applied to the top of the FPC, which is attached firmly to the inside bottom surface 3 of the base 2, to seal the hole 15. In the fourth embodiment, the FPC 8 has no installation section 8b. Therefore, a portion of the firmly attached surface of the airtight seal 16 is attached directly to the inside bottom surface 3 of the base 2.

Figure 12:
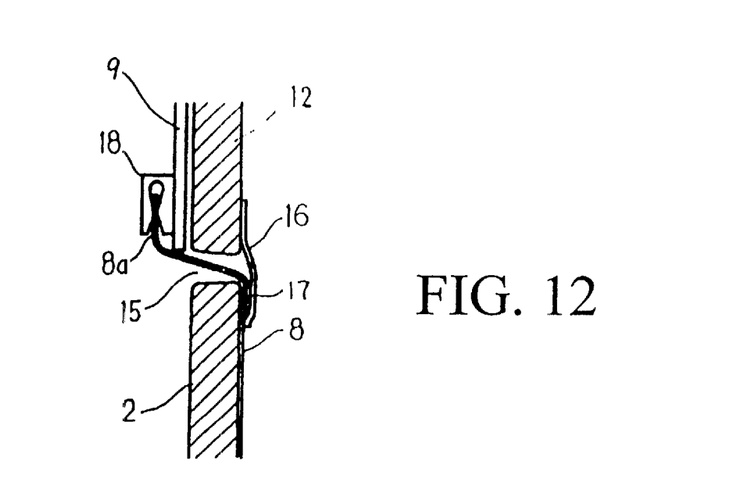
FIG. 12 is a cross section view of the disk drive device of FIG. 11, taken along line 12A—12A in FIG. 11.

FIG. 12 shows a cross section taken along the line 12A—12A of the magnetic disk drive device shown in FIG. 11. In the first and second embodiments of this invention, the airtight seal 16 is applied to the FPC 8. However, as shown in FIG. 12, in the fourth embodiment, double-sided adhesive tape 17 is applied to the area on one side of the hole 15 and the airtight seal 16 is applied to the top of the FPC. In the area on the other side of the hole, double-sided adhesive tape is applied directly to the inside bottom surface 3 of the base 2.

In other words, in the fourth embodiment, the height of the airtight seal 16 and the height of the joining surface are not uniform. One is higher than the other. For this reason, compared with the structure of the FPCs of the embodiments previously described, this creates somewhat of a disadvantage in terms of sealing the housing so that it is airtight. However, the advantages are that not only is the guide plate not required, the same FPC shape that has been used up to now in the prior art can continue to be used. This allows for the realization of the lowest cost FPC structure as well as for a short FPC wiring length.

In all of the embodiments described above, from the first to the fourth, a description of an FPC structure that transfers signals between the heads 6 and the control printed circuit board 9 was provided as an example. However, it is also possible to apply this to the structure of an electrical feed FPC that feeds electricity to the spindle motor that rotates the disk 5. By applying this invention, it is possible to limit the noise that accompanies the driving of the spindle motor to a minimum, which will contribute to improving the recording and playback characteristics of the magnetic disk drive device.

Based on the FPC layout structures of this invention, the FPC is passed through a hole provided in the base of the housing and extended to the outside of the housing. This allows the length of the FPC wiring to be shortened. As a result of this, it is more difficult for noise to enter signals, making the transfer of high quality signals possible.

In addition to this, because the cover component for closing off the hole in the base of the housing can be made of a simple component, this invention promotes a reduction in production costs.

Further, it is now possible to flatten the sealing surfaces of the FPC and the base of the housing by means of an installation section that surrounds the front end of the FPC. This results in a tighter seal of the housing, which promotes an improvement in the reliability of the disk drive device.

While particular embodiments of the invention have been described, it will be appreciated by those skilled in the art that changes and modifications may be made thereto without departing from the invention in its broader aspects, as set forth in the following claims.

What is claimed is:

1. A device comprising:
   a cable which connects components located inside the device with other components located outside the device,
   a base having an opening through which said cable passes; and
   a cover secured around a periphery of the opening to seal the opening,
   wherein said cable has electrical lines in a first part of a flexible printed circuit (FPC), said first part passing across and contacting a portion of the periphery of said opening and through said opening, said FPC having a second part which surrounds said opening,
   further wherein said first part is a cut out portion of an inner area of said second part.

2. The device of claim 1 wherein said cover is secured directly to said base, except where said cover crosses said electrical lines.

3. The device of claim 1 wherein said second part of said FPC is secured to said base with double sided adhesive tape and includes said portion of said first part which passes the periphery of said opening.

4. The device of claim 1 wherein said cover comprises a guide plate which is secured to said base, said FPC being secured to said guide plate beneath said guide plate.

5. The device of claim 4 wherein said FPC is secured to said guide plate by double sided adhesive tape.

6. The device of claim 5 comprising packing material around said opening periphery between said FPC and said base.

7. The device of claim 1 wherein said cover is grounded.

8. The device of claim 1 wherein said first part of said FPC has a portion that is parallel to said base and another portion that is bent at an angle so as to extend through said opening.

9. The device of claim 1 wherein said second part of said FPC forms a peripheral loop surrounding the periphery of said opening.

10. A disk drive device comprising:
    a base having an opening;
    one or more heads inside of said base for writing or reading data on disk media, an actuator for driving said heads in the radial direction on said disk media, said head and said actuator being located on an inside surface of said base, said actuator being controlled by components outside of said base, a cable which electrically connects said actuator to said components, said cable passing through and contacting said opening, and a cover component over said opening, said cover component being adhesively secured around a periphery of said opening to seal said opening, wherein said cable has an end that extends outside of the base; and an expanded area that is formed as a single unit with said cable and surrounds said end; said expanded area being attached to the area around said opening, further wherein the portion of said cable that passes through and contacts said opening is a cut portion of said expanded area.

11. The device of claim 10 wherein said cable is attached to the base bottom surface around the edge of said opening; said cover component being placed such that it covers said opening and is attached to said cable.

12. The disk drive device described in claim 10, wherein said cover component is attached to said expanded area.

13. The disk drive device described in claim 12, wherein said cable has a ground wire; and said cover component is in electrical contact with said ground wire.

14. The disk drive device described in claim 13, wherein said cover component has conductivity.

* * * * *